W. F. WHITNEY & E. STORM.
VEHICLE-SPRING.
No. 175,541. Patented March 28, 1876.
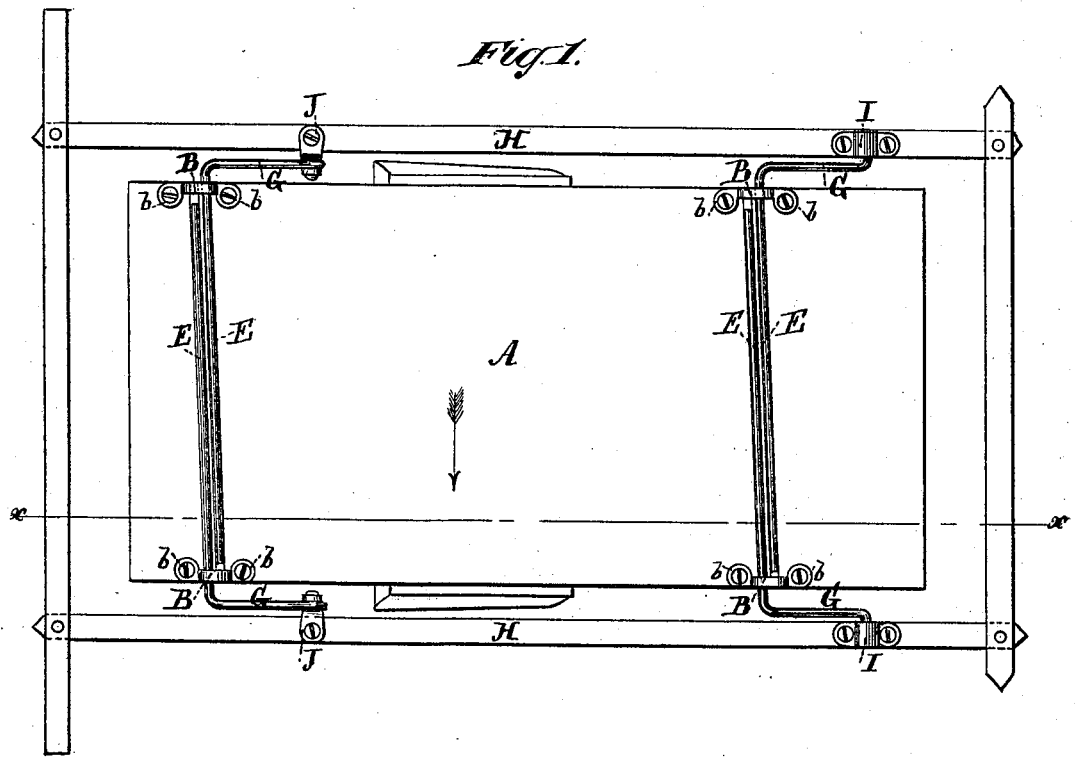
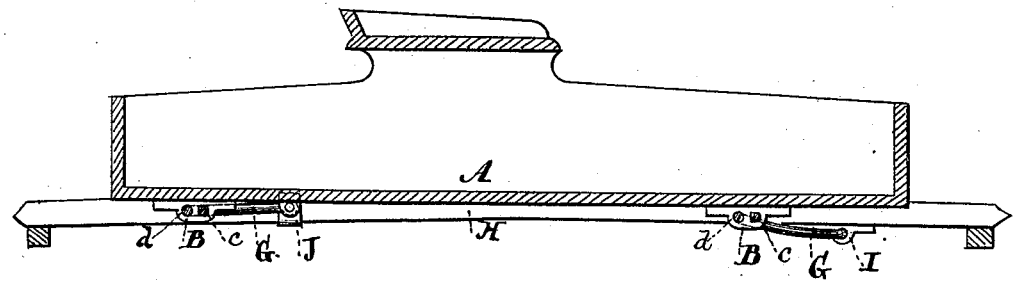

UNITED STATES PATENT OFFICE.

WILLIAM F. WHITNEY AND EDWARD STORM, OF POUGHKEEPSIE, N. Y.

IMPROVEMENT IN VEHICLE-SPRINGS.

Specification forming part of Letters Patent No. 175,541, dated March 28, 1876; application filed December 18, 1875.

*To all whom it may concern:*

Be it known that we, WILLIAM F. WHITNEY and EDWARD STORM, of Poughkeepsie, in the county of Dutchess and State of New York, have invented an Improvement in Springs for Vehicles; and we do hereby declare that the following is a full, clear, and exact description of the same.

Our invention relates to certain improvements on those for which Letters Patent were granted to William F. Whitney, dated July 13, 1875, No. 165,041, and October 26, 1875, No. 169,323, in which the springs operate on the torsion principle; and it consists in a novel arrangement and combination of torsion-springs arranged transversely, and side bars arranged longitudinally, of the body of the vehicle, as hereinafter particularly described.

In carrying out our invention we construct the springs in a similar manner, and attach them to the body of the vehicle by similar means, to those shown in the patents referred to. The side bars are arranged in a similar manner to those shown in the last-named patent; but the torsion-rods, instead of being arranged longitudinally of the body, as in said patent, are arranged transversely, as in the first-named patent.

The accompanying drawing illustrates the manner of carrying out the present invention, Figure 1 being a bottom view of a vehicle; and Fig. 2, a longitudinal vertical section taken in the line $x\ x$ of Fig. 1, looking in the direction indicated by the arrow.

The body A may be of any ordinary construction. B is a metallic bracket, at the ends of which are perforated lugs $b\ b$, for securing it to the under side of the bottom of the body A. About midway of the length of the bracket are two holes, one of which is round and the other square. The square hole $c$ is for the reception of a square tenon on one end of a rod, E, and the round hole $d$ is for the reception of the round portion of a similar rod. Four of these brackets are attached to the under side of the body A, near the four corners thereof, with the length of the bracket parallel with the length of the body.

The rods E are made of elastic steel, and serve as springs by operating on the torsion principle. They are applied to the brackets by inserting the square tenon in the square hole $c$ of one bracket, while the round portion of the rod passes through, and works freely in, the round hole $d$ in the opposite bracket. Two of the rods are applied to the brackets which are near the rear end of the body, and two more to those which are near the front end. The rods are so arranged that the square tenon of one rod engages with the square socket in the bracket on one side of the body, and the square tenon of the other rod engages with the square socket in the bracket on the opposite side, so that the projecting round portions of the rods of each pair are on opposite sides of the body. The projecting portions of the rods are provided with arms G, extending at about right angles with the length thereof, and having their extreme ends connected with the side bars of the vehicle. These arms may each be in one piece with the torsion-rod which carries it, or made separately and attached in any suitable manner. They are here shown as made each in the same piece with the rod.

The side bars H may be arranged in a similar manner to those shown in the patent of October 26, 1875, before referred to, or in any other suitable manner.

The ends of the arms may be connected to the side bars by means of links or sockets of any suitable description. The arms may be arranged to extend in opposite directions; but by arranging them so as to extend all in the same direction, as shown, the links may be dispensed with.

Two modes of connecting the arms to the side bars are shown in the drawing. Those near the front of the body are shown as having their extreme ends bent outward, and working in sockets in brackets I, screwed to the bars. Those near the rear end of the body are shown as connected to brackets J on the bars by pins passing through said brackets and through the ends of the arms, and forming pivots for said arms. Either of these modes may be adapted for connecting the arms to the bars.

By the arrangement and combination of parts herein described a cheap, simple, and elastic side-bar vehicle is produced.

What we claim as new, and desire to secure by Letters Patent, is—

The combination, with the body A of the vehicle, of the longitudinal side bars H, the brackets B, provided with sockets for holding the springs, and the torsion-springs E G, arranged transversely to said bars H, substantially as described.

WM. F. WHITNEY.
EDWARD STORM.

Witnesses:
DANL. W. MOWRY,
WM. R. WOODIN.